(12) United States Patent
Nishida et al.

(10) Patent No.: US 7,860,652 B2
(45) Date of Patent: Dec. 28, 2010

(54) LANE DETECTING APPARATUS

(75) Inventors: Makoto Nishida, Aichi-ken (JP); Tomoyasu Tamaoki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 668 days.

(21) Appl. No.: 11/937,718

(22) Filed: Nov. 9, 2007

(65) Prior Publication Data

US 2008/0114532 A1    May 15, 2008

(30) Foreign Application Priority Data

Nov. 14, 2006   (JP) .............................. 2006-307936

(51) Int. Cl.
*G01C 21/26* (2006.01)
*B60W 30/12* (2006.01)

(52) U.S. Cl. ......................................... 701/223; 701/28

(58) Field of Classification Search ................... 701/200
See application file for complete search history.

(56) References Cited

U.S. PATENT DOCUMENTS

2009/0016819 A1*   1/2009   Vu et al. .................. 404/84.05

2010/0138115 A1*   6/2010   Kageyama et al. ............. 701/46
2010/0169007 A1*   7/2010   Kaushik et al. ............. 701/208

FOREIGN PATENT DOCUMENTS

| JP | 2003-123058 | 4/2003 |
|----|-------------|--------|
| JP | 2003-168123 | 6/2003 |
| JP | 2004-310522 | 11/2004 |
| JP | 2005-346382 | 12/2005 |
| JP | 2005-346383 | 12/2005 |

* cited by examiner

*Primary Examiner*—Thomas G Black
*Assistant Examiner*—Shelley Chen
(74) *Attorney, Agent, or Firm*—Oblon, Spivak, McClelland, Maier & Neustadt, L.L.P.

(57) ABSTRACT

The present invention discloses a lane detecting apparatus mounted on a vehicle including a camera for obtaining an image of a lane marking drawn on a road, a candidate line selecting part for selecting one or more candidate lines having edge information no less than an edge threshold from the image obtained by the camera, and a car pool lane determining part for determining whether the difference in the number of the candidate lines between the left side of the vehicle and the right side of the vehicle is no less than a predetermined value. When the difference is no less than the predetermined value, the lane detecting apparatus transfers to a car pool lane detection mode in which the candidate line selecting part detects the one or more candidate lines in accordance with a threshold that is less than the edge threshold.

3 Claims, 6 Drawing Sheets

LANE DETECTING APPARATUS

BACKGROUND OF THE INVENTION

1. Field of the Invention

The present invention generally relates to a lane detecting apparatus for detecting boundary lines drawn on a road based on images input from a camera mounted on a vehicle.

2. Description of the Related Art

Lane keeping assist (hereinafter referred to as "LKA") control is performed by detecting the boundary lines (hereinafter also simply referred to as "lines") that divide a road in accordance with input images of the road obtained by a camera and assisting the steering of the driver so that the vehicle is driven along a target traveling line positioned substantially at the center between the lines on both sides (left and right). For example, when the amount of deviation from the target traveling line increases, an assisting steering force for reducing the amount of deviation is supplied.

The line of a road is not always drawn as a straight line at an intersecting point or a junction, but can also be curved or bent. When such a line is detected in performing LKA control, an assisting steering force towards the bending direction is supplied even where the road extends in a straight direction. Therefore, there is proposed a technology of determining whether a detected line is a line for indicating a branching point for recognizing lines in correspondence with a branching point, etc., (for example, see Japanese Laid-Open Patent Application No. 2005-346382, hereinafter referred to as "Patent Document 1" and Japanese Laid-Open Patent Application No. 2005-346383, hereinafter referred to as "Patent Document 2"). With this technology, in a case where a line branching away from the traveling road is detected, an unnecessary assisting steering force can be prevented from being supplied by not referring to the detected line for a predetermined period.

However, a road may have other bent lines besides those indicating a branching point. For example, although a car pool lane has bent lines drawn at its exit part, it is difficult to apply the technologies disclosed in Patent Documents 1 or 2 to such a car pool lane.

SUMMARY OF THE INVENTION

The present invention may provide a lane detecting apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a lane detecting apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a lane detecting apparatus mounted on a vehicle, the lane detecting apparatus including: a camera for obtaining an image of a lane marking drawn on a road; a candidate line selecting part for selecting one or more candidate lines having edge information no less than an edge threshold from the image obtained by the camera; and a car pool lane determining part for determining whether the difference in the number of the candidate lines between the left side of the vehicle and the right side of the vehicle is no less than a predetermined value; wherein when the difference is no less than the predetermined value, the lane detecting apparatus transfers to a car pool lane detection mode in which the candidate line selecting part detects the one or more candidate lines in accordance with a threshold that is less than the edge threshold.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
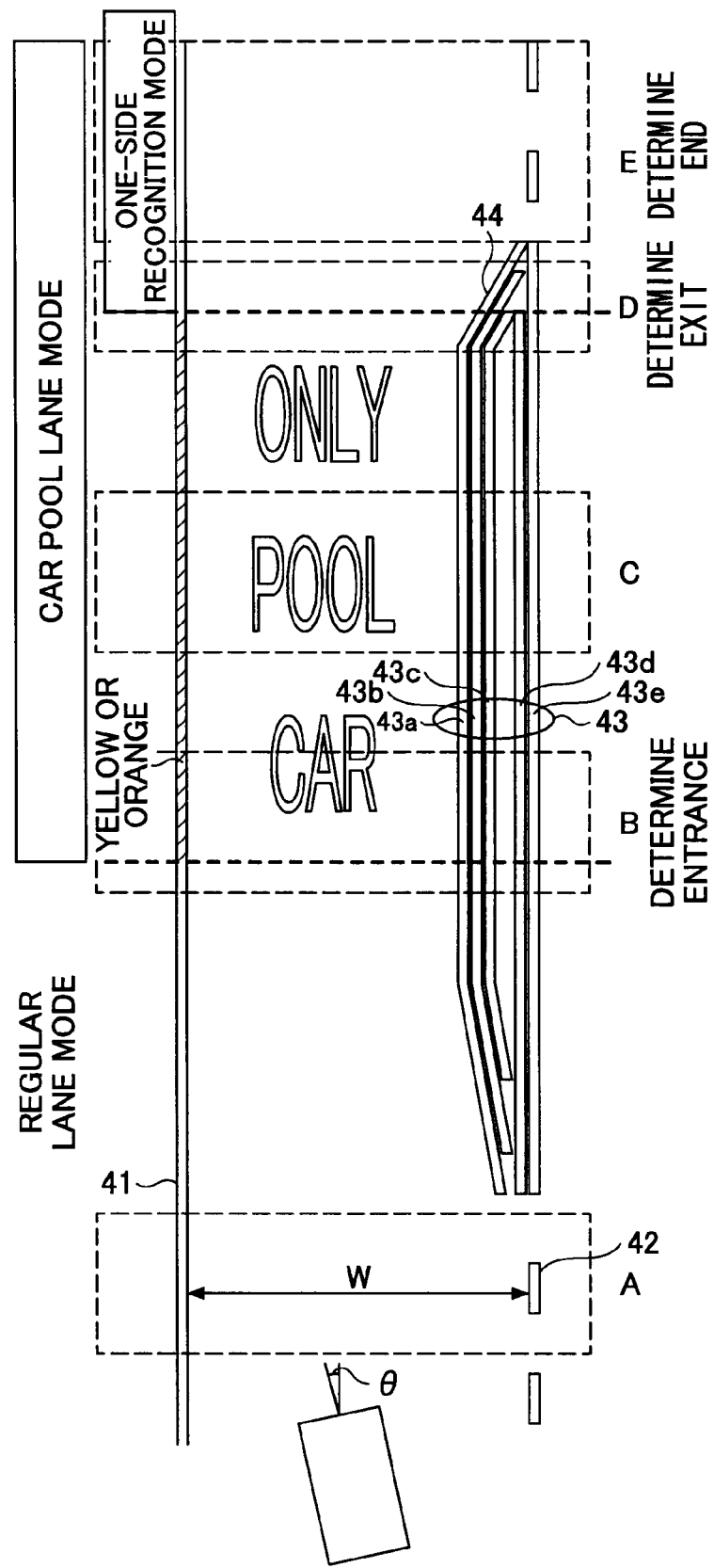
FIG. 1 is a schematic diagram showing an example of a car pool lane (CPL)

In some countries, a traffic lane may be designated as a car pool lane (hereinafter referred to as "CPL") which use is limited for only a vehicle having two or more passengers or a vehicle satisfying a predetermined environmental standard. FIG. 1 is a schematic diagram showing an example of a CPL. In FIG. 1, the CPL is the area illustrated as "CAR POOL ONLY". The CPL is distinguished from other lanes by a boundary line colored in yellow or orange on its left side (hereinafter simply referred to as "left line") and plural boundary lines on its right side (hereinafter simply referred to as "right line"). At the entrance part of the CPL, the right line is inclined inward for providing an entrance for guiding a vehicle to the CPL. At the exit part of the CPL, the lane is branched by having the right line bent outward.

In performing LKA (Lane Keeping Assist) control with the conventional technology, when the LKA control is turned on when traveling in the CPL for assisting the steering of the driver so that the vehicle is driven along a target traveling line positioned substantially at the center between the lines on both sides (left and right), the vehicle may perform a yaw motion due to an assisting steering torque working toward the outward direction at the exit part of the CPL. However, a traffic lane detecting apparatus 10 according to an embodiment of the present invention recognizes traffic lanes so as to prevent a vehicle from performing a yaw motion at the exit part of the CPL.

Figure 2:
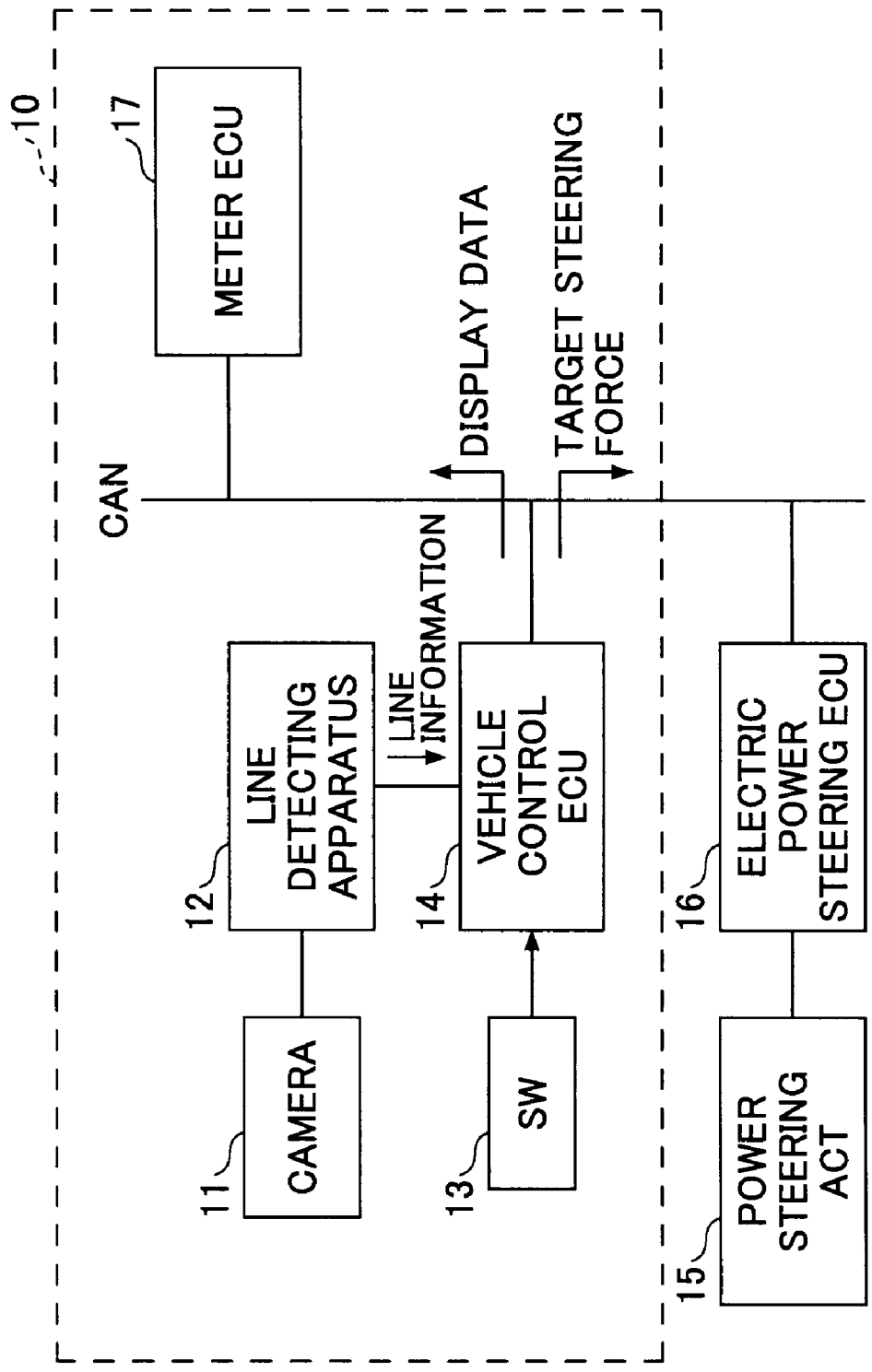
FIG. 2 is a block diagram for describing functions of a lane detecting apparatus according to an embodiment of the present invention.

FIG. 2 is a block diagram for describing the functions of the traffic lane detecting apparatus 10 according to an embodiment of the present invention. The traffic lane detecting apparatus 10 includes, for example, a vehicle control ECU (Electronic Control Unit) 14 for controlling the vehicle according to a detected line(s) and a meter ECU 17 for controlling the lighting of various indicator lamps of a combination panel, which ECUs are connected by an in-vehicle LAN, e.g., CAN (Controller Area Network).

The vehicle control ECU 14 is connected to a line detecting apparatus 12. The line detecting apparatus 12 is for detecting a line(s) from image data (hereinafter also referred to as "frame") of images taken by a camera 11. The camera 11 is mounted, for example, on an inside cabin mirror and is placed horizontally facing the front of the vehicle for taking images of an area spreading in a predetermined angular range. The camera 11 outputs frames of a predetermined brightness level (e.g., 256 level) with a CMOS (Complementary Metal Oxide Semiconductor) or a CCD (Charge Coupled Device).

Figure 3:
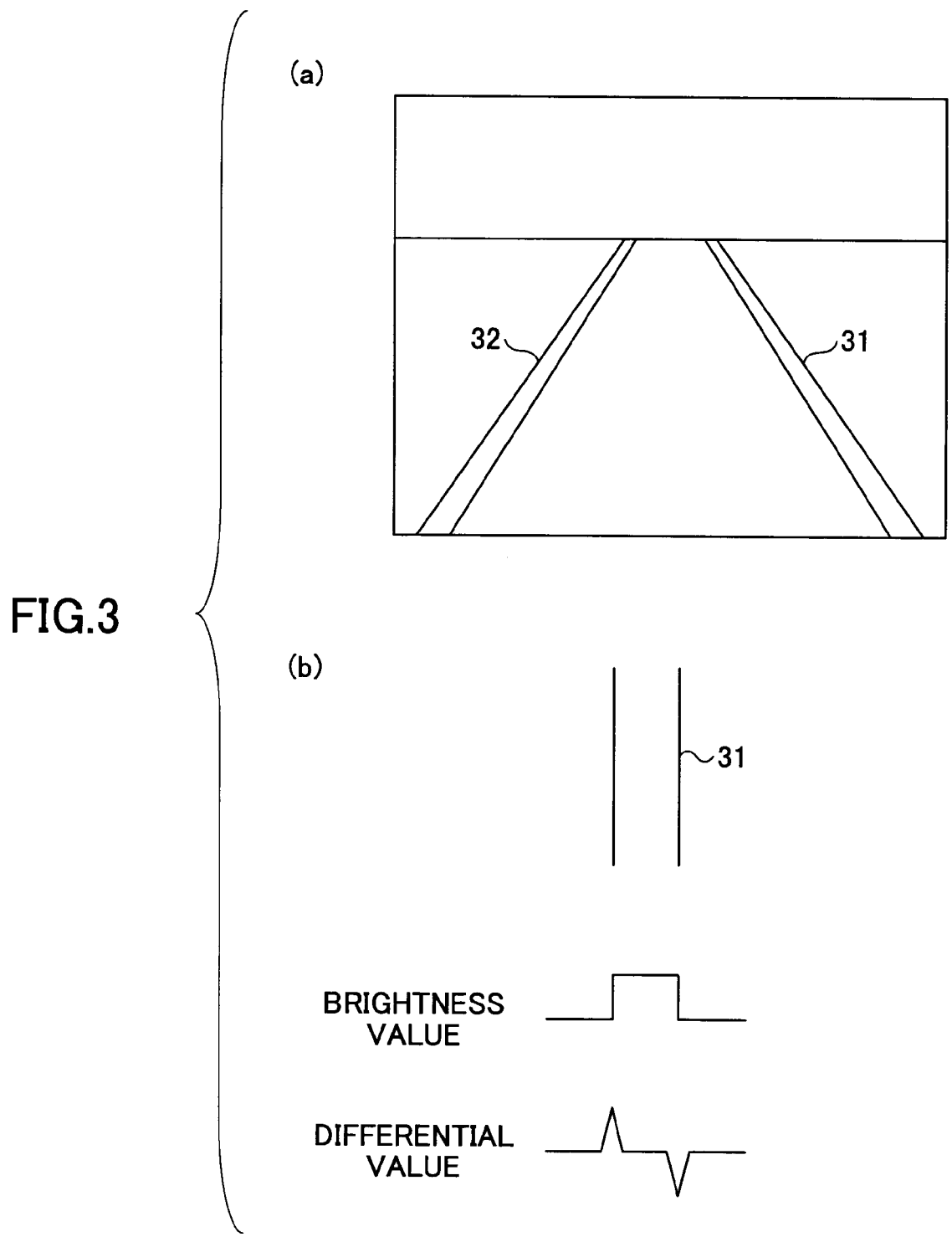
FIG. 3 is a schematic diagram for describing a frame taken by a camera and an image process technique.

The line detecting apparatus 12 performs image processing on the frames successively taken by the camera 11 in a predetermined cyclic period of time and detects the left and right lines drawn on the road for dividing the traffic lane. FIG. 3(*a*) shows an example of a frame taken by the camera 11. The substantially straight lines shown in the frame are the left line 32 and the right line 31 which intersect at the upper part of the frame to form an upside-down V-like shape.

FIG. 3(*b*) is a schematic diagram for describing a process of detecting a line by analyzing a frame. The line detecting apparatus 12 searches for an area having a brightness no less than a predetermined threshold from the bottom part of the frame to the upper part of the frame. As shown in FIG. 3(*b*), since a line has edges (high frequency components) on both ends, peaks can be obtained at both ends of the line by differentiating the brightness value of the frame in a horizontal direction. Thereby, such an area can be estimated as the line part. For example, a selection line of the line (candidate of the line) is selected by extracting a line(s) from the estimated line part according to a threshold defined by brightness or the contrast with respect to a road (hereinafter also referred to as "edge threshold") and the threshold of the width of the line and performing a process of matching the features (e.g., linearity) of the extracted line.

The line detecting apparatus 12 sends line information (line data) to the vehicle control ECU 14 in accordance with the selected line. The line information includes, for example, road curvature R of the traveling lane, the yaw angle θ of the vehicle, the road width, and the offset amount from the target traveling line (e.g., center line).

In a case where the switch SW 13 of the LKA is turned on, the vehicle control ECU 14 performs LKA control by using the line information. The vehicle control ECU 14 sends display data to the meter ECU 17. The display data include, for example, data indicating that the LKA control is active, and data requesting display of the status of the LKA system. For example, in a case where a vehicle is bound to deviate from a traffic lane, the vehicle control ECU sends display data to the meter ECU 14 requesting to sound an alarm or to display a warning. Furthermore, in order to have the vehicle travel in the vicinity of the center of a traffic lane, the vehicle control ECU 14 sends a target steering force to an electric power steering ECU in accordance with the amount of deviation from the center of the traffic lane. Thereby, a small steering force is applied to the steering of the vehicle for reducing the workload of the driver.

The electric power steering ECU controls a power steering ACT (actuator), which serves to drive the rotation of a steering shaft, via a deceleration gear in accordance with the target steering force. Furthermore, the electric power steering ECU 16 drives the power steering ACT for applying an assisting steering torque for the driver in accordance with the steering torque of the driver and the steering direction detected by a torque sensor of the steering shaft.

It is to be noted that the line detecting apparatus 12, the vehicle control ECU 14, the meter ECU 17, and the electric power steering ECU 16 are configured as a microcomputer having a CPU for executing programs, a ROM for storing programs therein, a RAM or EEPROM (Electronically Erasable and Programmable Read Only Memory) for temporarily storing data and programs therein, an input/output interface for inputting/outputting data, and a communication part for communicating with other ECUs that are connected by a bus.

Figure 4:
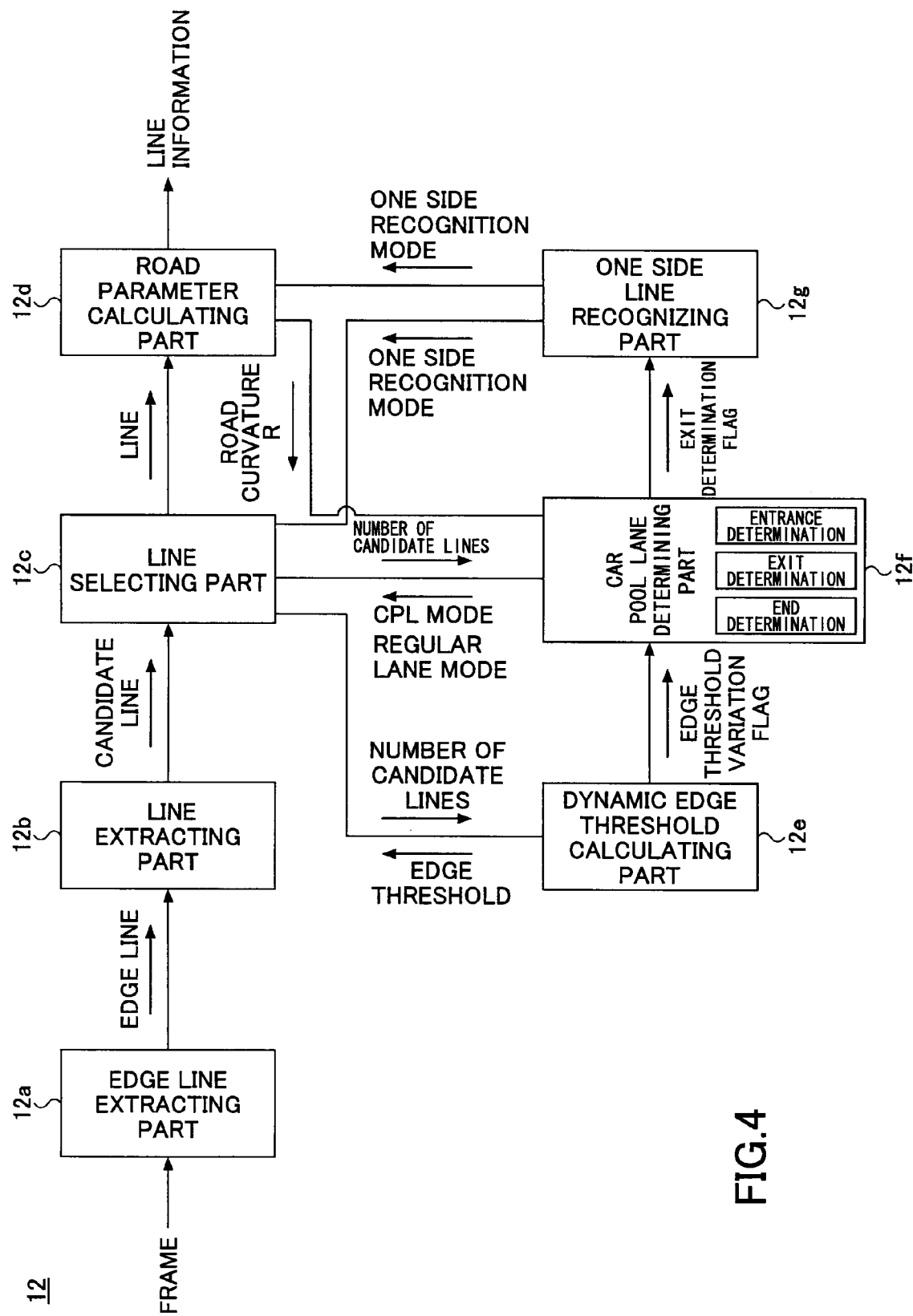
FIG. 4 is a schematic diagram for describing each function in performing lane detection with a line detecting apparatus according to an embodiment of the present invention.

FIG. 4 is a schematic diagram for describing the functions achieved by the line detecting apparatus 12 in performing traffic lane detection according to an embodiment of the present invention. The functions shown in FIG. 4 may be realized by executing a program. The frame taken by the camera 11 is input into an edge line extracting part 12*a* and is output as line information in correspondence with the mode for detecting a line (traffic lane detection mode). The detection mode includes, for example, a CPL mode for calculating line information during traveling in a CPL, a one-side recognition mode for calculating line information from a line on one side of the lane, and a regular lane mode for calculating line information in other lanes besides the CPL.

Next, a line detecting operation is described in further detail. The edge line extracting part 12*a* performs a differentiation process on the brightness value of a frame in a horizontal direction and determines that the point in which brightness abruptly changes is the edge point. Thereby, the edge line(s) is extracted by plural edge points detected in a vertical direction (upper/lower direction) of the frame. Then, a line extracting part 12*b* extracts plural pairs of candidate lines which are corresponding pairs of the edge lines extracted by the edge line extracting part 12*a*. Then, a line selecting part 12*c* selects one or more lines or seemingly lines from the plural pairs of candidate lines extracted by the line extracting part 12*b* in accordance with conditions such as edge threshold or line width.

For example, in the CPL shown in FIG. 1, the vehicle selects the line 41 on its left and the line 42 on its right upon reaching the area indicated with the letter "A". Then, a road parameter calculating part 12*d* calculates line information (e.g., road curvature R, yaw angle θ, road width W, offset amount with respect to a target traveling lane) according to the selected left line 41 and the right line 42. The road curvature R is the average value of the curvature of the left and right lines 41, 42. In a case where the road curves to the right with respect to the traveling direction of the vehicle, the road curvature R is positive. In a case where the road curves to the left with respect to the traveling direction of the vehicle, the road curvature R is negative. Given that the camera 11 is fixed to the vehicle, the yaw angle θ is the average value of the fluctuation (swinging) angle of the left and right lines 41, 42 with respect to the direction of the road on which the vehicle is traveling (road direction). In a case where the vehicle swings toward the right of the traveling direction, the yaw angle θ is positive. In a case where the vehicle swings toward the left of the traveling direction, the yaw angle θ is negative. The road width W is the space between the center of the left line 41 and the center of the right line 42. The offset amount (deviation amount) is the amount of deviation between the center of the traveling lane and the center of the vehicle. In a case where the vehicle deviates to the right with respect to the traveling lane, the offset amount is positive. In a case where the vehicle deviates to the left with respect to the traveling lane, the offset amount is negative.

The road parameter calculating part 12d repeats the operation of outputting line information for each frame regardless of the traffic lane detection mode.

A dynamic edge threshold calculating part 12e calculates a threshold used for enabling the line selecting part 12c to select a line in accordance with the recognized status of the left and right lines 41, 42. In a case where two or more candidate lines are on either the left side or the right side, the dynamic edge threshold calculating part 12e increases the edge threshold (upper limit set with a predetermined value M). In a case where no candidate line is detected on both the left and right sides, the dynamic edge threshold calculating part 12e reduces the threshold. Accordingly, as described in further detail below, the edge thresholds when traveling in the CPL are calculated according to the characteristics of the CPL.

A CPL determining part 12f performs determination of the CPL start (entrance), determination of the CPL exit, and determination of the CPL end. First, the determination of the CPL entrance is described. In a case where hunting is detected in which there is a fluctuation of edge threshold, the CPL determining part 12f determines that the vehicle has entered the start of the CPL. Upon reaching area B shown in FIG. 1, the line selecting part 12c detects plural candidate lines 43a through 43e on the right side. Meanwhile, the line selecting part 12c may possibly detect a single candidate line (left candidate line) on the left side. The reason why the line selecting part 12c may "possibly" detect the single candidate line on the left side is that the line selecting part 12c may not detect any candidate line from the edge threshold due to the yellow or orange colored left line which causes the left line to have lower contrast with respect to the road compared to that of the right line.

When the vehicle enters the CPL, the dynamic edge threshold calculating part 12e calculates (outputs) an increased edge threshold since plural right candidate lines are constantly detected. In a single frame, a single edge threshold is applied and a candidate line is detected. Thus, the increased edge threshold causes the line selecting part 12c to lose track of the left line having low contrast. Accordingly, the dynamic edge threshold calculating part 12e calculates (outputs) a reduced edge threshold. Therefore, in a frame with the reduced edge threshold applied, both the left line and the plural right lines are detected. Therefore, an increased edge threshold is applied in the next frame. Hence, as this process is repeated for each frame, the fluctuation of the edge threshold is initiated when entering the CPL.

A CPL determining part 12f monitors the edge threshold of the past predetermined number of frames (e.g., 50) and determines the start of the CPL when fluctuations of threshold are detected for a predetermined number of frames (e.g., 25).

The line detecting apparatus 12 transfers to a CPL mode when the CPL determining part 12f determines the start position of the CPL. In the CPL mode, the lines are detected under the following settings.

a) Set the upper limit of the edge threshold with a value lower than N (e.g., N=M/10). By setting the upper limit of the edge threshold with an extremely low value, the left line having low contrast can be constantly detected.

b) Do not conduct immediate re-detection even when losing track of either the left line or the right line. For example, in a case of a regular lane, line information can be re-calculated by immediately re-detecting a line(s) when losing track of either the left line or the right line. More specifically, in the case of a regular lane where a line is detected with an interval of one second, re-detection of a line is conducted with an interval of 0.2 seconds when losing track of either the left line or the right line. On the other hand, in a case of a CPL mode, instead of conducting immediate re-detection when losing track of either the left line or the right line, the re-detection of a line is conducted after waiting for a predetermined cyclic period (e.g., one second). This prevents erroneous recognition in the CPL having many signs drawn on the road.

c) Do not transfer to a Bots Dots mode. Bots dots are reflective bumps embedded in a line. Since the lines having the bots dots have different brightness, etc., the vehicle transfers to a bots dots mode in a case where bots dots are detected in a regular lane. However, since there are no bots dots in a CPL, the transfer to the bots dots mode is prohibited.

Therefore, when the vehicle is traveling in area C of the CPL shown in FIG. 1, the line selecting part 12c can constantly detect the left line and the plural right lines by referring to the edge threshold having an extremely low upper limit (i.e. low edge threshold). According to an embodiment of the present invention, in a case where plural lines are detected, the road parameter calculating part 12d detects line information based on the innermost lines. Therefore, in traveling in the CPL, the line information (line data) transmitted from the road parameter calculating part 12d to the vehicle control ECU is line information corresponding to the left line and the innermost right line.

Next, the determination of the CPL exit is described. After the transfer to the CPL mode, the CPL determining part 12f detects an exit part of the CPL by referring to the characteristics of the exit part of the CPL. As shown in area D of FIG. 1, the exit part of the CPL includes a bent line 44. The CPL determining part 12f monitors the road curvature R of the line 44 during the CPL mode. The CPL determining part 12f determines that the vehicle has reached the exit part of the CPL when a road curvature R is no less than a predetermined value. Accordingly, the CPL determining part 12f switches on an exit determination flag. It is to be noted that, since the threshold for detecting the bending of the line of the exit part is less than the road curvature for detecting a left turn or a right turn, the threshold is set with a value enabling detection of the exit part which is not bent as much as a left turn or a right turn.

When the exit determination flag is switched on, a one-side line recognizing part 12g transfers the line selecting part 12c and the road parameter calculating part 12d to a one-side recognition mode (described below). Accordingly, the line selecting part 12c and the road parameter calculating part 12d output line information from a line situated on one side.

Next, the determination of the CPL end is described. The CPL determining part 12f determines whether the CPL has ended after the exit determination flag is switched on. After passing the exit part of the CPL, the vehicle travels in a regular lane as shown in area E of FIG. 1. Accordingly, there is no difference in the numbers of lines detected on the left side and the right side. Therefore, in a case where a predetermined number of frames (e.g., 30) continue to indicate no difference in the numbers of lines detected on the left and right sides, the CPL determining part 12f determines that the vehicle is traveling on a regular lane, ends the CPL mode, and transfers to a regular lane mode.

Along with the process of determining the end of the CPL, the line detecting apparatus 12 transfers from a line detection mode to a one-side recognition mode when the exit determination flag is switched on. The one-side recognition mode is a mode for detecting line information only from a left line (or a right line). Therefore, in this embodiment of the present invention, when the exit part of the CPL is detected, the road parameter calculating part 12d ignores the right line bent to the right and calculates the line information only from the left line. Therefore, the vehicle can be prevented from performing a yaw motion in an outward direction.

Since line information is detected only from the left line, it becomes difficult to detect the road width W and the center line. Accordingly, in the one-side recognition mode, the line information detected from previously selected line(s), that is, the line information detected from the lines 42, 43a of the CPL before entering the exit part, are used.

Figure 5:
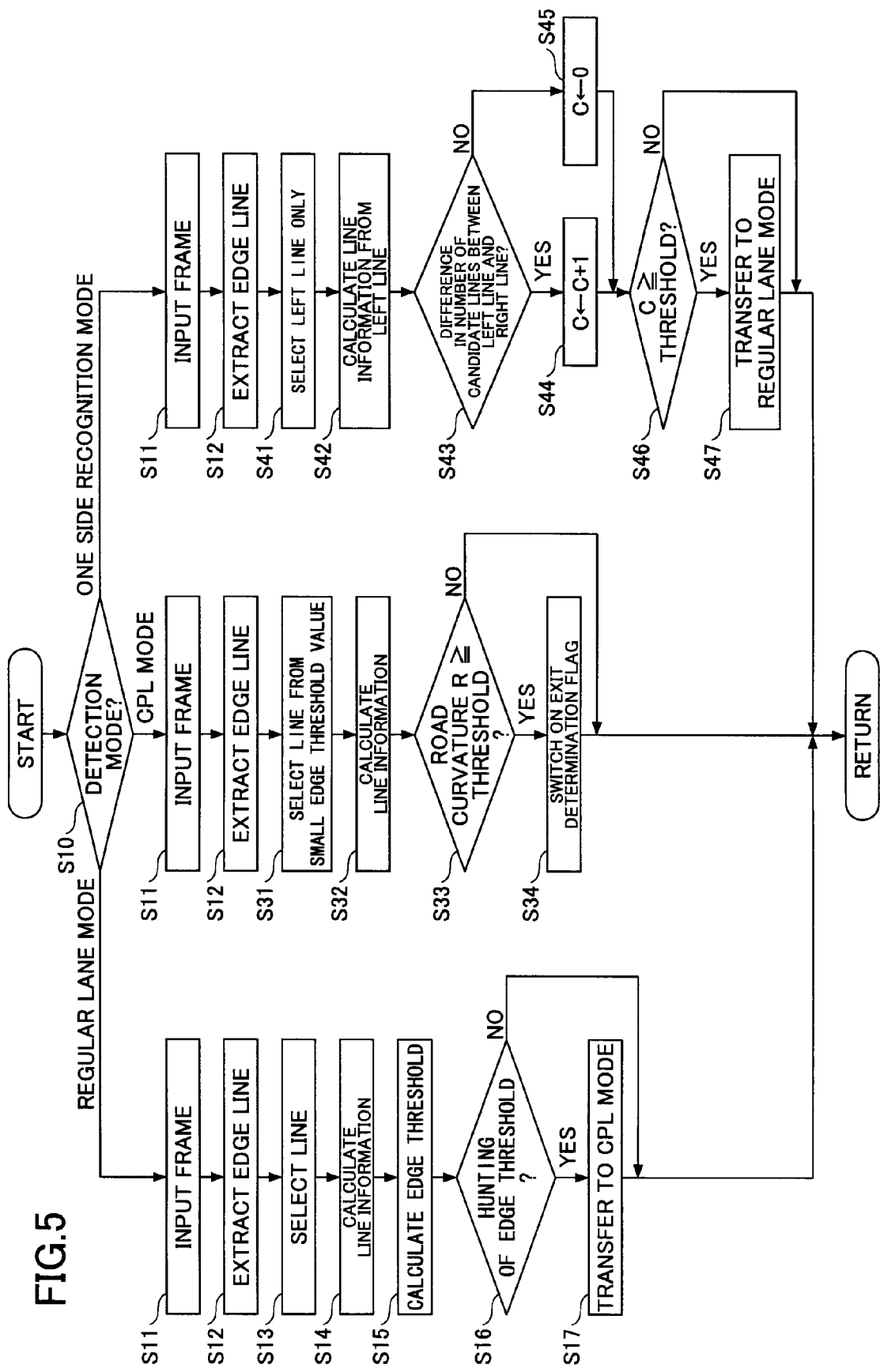
FIG. 5 is a flowchart for describing an operation of detecting line information according to a line detection mode and transferring (transition) of the line detection modes according to an embodiment of the present invention.

FIG. 5 is a flowchart showing describing the process of detecting line information in accordance with the detection mode and the process of transferring to different detection modes according to an embodiment of the present invention. The flowchart shown in FIG. 5 begins when, for example, a switch SW 13 is turned on.

First, the line detecting apparatus 12 determines the line detection mode for each frame (Step S10). That is, the line detecting apparatus 12 determines whether the line detection mode is to be a regular lane detection mode, a CPL detection mode, or a one-side recognition mode.

[Regular Lane Detection Mode]

The frames (images) taken by the camera 11 are successively input to the edge line extracting part 12a (Step S11). The edge line extracting part 12a extracts plural edge points for each frame and extracts plural edge lines by performing a known technique of Hough transform on the plural edge points (Step S12). Then, the line extracting part 12b extracts plural pairs of candidate lines from the plural extracted edge lines, and the line selecting part 12c selects a line(s) from the extracted plural pairs of candidate lines based on a predetermined condition (e.g., edge threshold) (Step S13).

Then, the road parameter calculating part 12d calculates line information. In a regular lane, the road parameter calculating part 12d calculates line information (e.g., road curvature R, yaw angle θ, road width W, offset amount) in accordance with the line selected in Step S13. The line information (line data) are sent to the vehicle control ECU 14.

Then, the dynamic edge threshold calculating part 12e calculates an edge threshold (Step S15). According to the status (data) of the line obtained in Step S13, the dynamic edge threshold calculating part 12e increases the edge threshold (within an upper limit of a predetermined value M) in a case where two or more candidate lines are detected on either one of the right side or the left side of the vehicle and reduces the edge threshold in a case where no candidate line is detected on either one or the right side or the left side of the vehicle.

Then, the dynamic edge threshold calculating part 12e compares the edge threshold before the calculation and the edge threshold after the calculation and determines whether there is a fluctuation of edge threshold. More specifically, the dynamic edge threshold calculating part 12e sends an edge threshold fluctuation flag to the CPL determining part 12f depending on whether the edge threshold is increased after the edge threshold has previously been reduced at an earlier frame (one frame earlier) or the edge threshold is reduced after the edge threshold has previously been increased at an earlier frame (one frame earlier) (Step S15). Accordingly, an edge threshold fluctuation flag which is switched on indicates that there is a fluctuation of edge threshold, and an edge threshold fluctuation flag which is switched off indicates that there is no fluctuation of edge threshold.

The CPL determining part 12f determines whether there is hunting of the edge threshold (Step S16). For example, the CPL determining part 12f successively stores a predetermined number of edge threshold fluctuation flags of the past (e.g., 50 flags) in a FIFO (First In First Out) memory area and determines that there is hunting of the edge threshold when half or more of the stored edge threshold fluctuation flags are switched on.

In a case where there is hunting of the edge threshold (Yes in Step S16), the CPL determining part 12f transfers from the line detection mode to a CPL mode (Step S17). In a case where there is no hunting of the edge threshold (No in Step S16), the next frame is processed according to the regular lane detection mode.

[CPL Mode]

In a case where the line detection mode is the CPL mode, the step of frame inputting step (Step S11) and the edge line extracting step (Step S12) are the same as those of the regular lane mode.

Then, the line detecting part 12b extracts plural pairs of candidate lines from plural extracted edge lines. However, in the CPL mode, the line selecting part 12c selects a line(s) from the extracted plural pairs of candidate lines based on an edge threshold (e.g., $\frac{1}{10}$) which is less than the edge threshold applied for the regular lane (Step S31). This enables the left line of the CPL to be easily detected and ensures detection of both the left and right lines.

Since there are plural lines on the right side of the vehicle in the CPL according to an embodiment of the present invention, the operation of detecting plural lines is described below. The edge line extracting part 12a extracts plural lines and pairs of peaks (see FIG. 3(*b*)) corresponding to the extracted lines by performing a differential process on the brightness values of a frame in a horizontal direction. Then, the edge line extracting part 12a detects the number of pairs of peaks and stores the positions of the peaks in a predetermined table. The table may have stored the following information.

the number of pairs of peaks
the position of first rising peak
the width of the first line
the position of the second dropping peak
the width of the second line (The above-information continues in correspondence with the number of line candidates.)

Then, the line selecting part 12c selects a line candidate based on whether a predetermined condition (e.g., line width, interval of each line) for extracting a line is satisfied. It is preferable to set the condition with consideration of, for example, standards which are used in a country or an area). The lane detecting apparatus 12 may be cooperate with a car navigation system for dynamically obtaining the country or area in real time and automatically optimize the value for line detection according to the location of the vehicle.

After plural candidate lines of the left line and the right line are detected, the road parameter calculating part 12d calculates line information based on, for example, the left line and the innermost right line (Step S32).

The line information is sent to the vehicle control ECU and is also used by the CPL determining part 12f for determining whether the road curvature R is no less than a predetermined threshold (Step S33). It would be difficult to detect a bent part of the exit part of the CPL if the road curvature R is monitored for each frame since the amount of variation is small. Therefore, the road curvature R of a previous period of time (e.g., five seconds) is buffered and the average road curvature R of the previous period of time is obtained. Then, it is determined whether the absolute value of the difference between the average road curvature and the current road curvature R is greater than a predetermined threshold (Step S33).

In a case where the CPL determining part result 12f is no less than the predetermined threshold (Yes in Step S33), the exit determination flag is switched on (Step S34). When the exit determination flag is switched on, the one-side line recognizing part 12g causes the line detecting apparatus 12 to transfer to the one-side recognition mode.

In a case where the road curvature R is less than the predetermined threshold (No in Step S33), the exit determination flag remains switched off. Accordingly, the next frame is processed according to the CPL mode.

[One-side Recognition Mode]

When the exit determination flag is switched on, the line detecting apparatus 12 transfers to the one-side recognition mode while the CPL determining part 12f determines the end of the CPL.

In a case where the line detection mode is the one-side recognition mode, the step of frame inputting step (Step S11) and the edge line extracting step (Step S12) are the same as those of the regular lane mode except that the road parameter calculating part 12d calculates line information based on only the left line according to an embodiment of the present invention.

The line extracting part 12b extracts plural pairs of candidate lines from the plural extracted edge lines, and the line selecting part 12c selects a line(s) from the extracted plural pairs of candidate lines based on a predetermined condition (e.g., edge threshold) (Step S41). In this step, the line extracting part 12c ignores the line situated substantially on the right half (when seen from the vehicle) from one earlier frame. Thereby, only the left line is detected.

Then, the road parameter calculating part 12d calculates line information based on the left line only (Step S42). Since there is no right line in the selected lines, the offset amount from a target traveling line is calculated according to the road curvature R and the yaw angle θ along with the road width W obtained (calculated) before entering the exit part. The calculated line information is sent to the vehicle control ECU 14.

Then, the CPL determining part 12f determines whether there is a difference in the numbers of candidate lines on the left side and the right side based on the candidate lines selected by the line selecting part 12c (Step S43). Since the number of right lines is greater than the number of left lines in the CPL, it can be determined that the CPL has ended and the current traveling lane is a regular lane if there is no difference in the numbers of candidate lines on the left side and the right side.

Since there is a possibly of an erroneous determination if the determination is performed based on only a single frame where a line on the left or right side is lost, the CPL determining part 12f increments a counter C once (Step S44) when there is no difference (Yes in Step S43). After the counter C is incremented for a predetermined number of times (e.g., 30), the line detecting apparatus 12 transfers to the regular lane mode (Step S47).

In a case where there is a difference (No in Step S43), the CPL determining part 12f initializes the counter C (Step S45). Therefore, the CPL mode is continued unless frames which indicate no difference are consecutively output for more than the predetermined number of times (e.g., 30).

After the operation shown in the flowchart of FIG. 5 is completed, the line detecting apparatus 12 repeats the operation shown in FIG. 5 for each frame.

Figure 6:
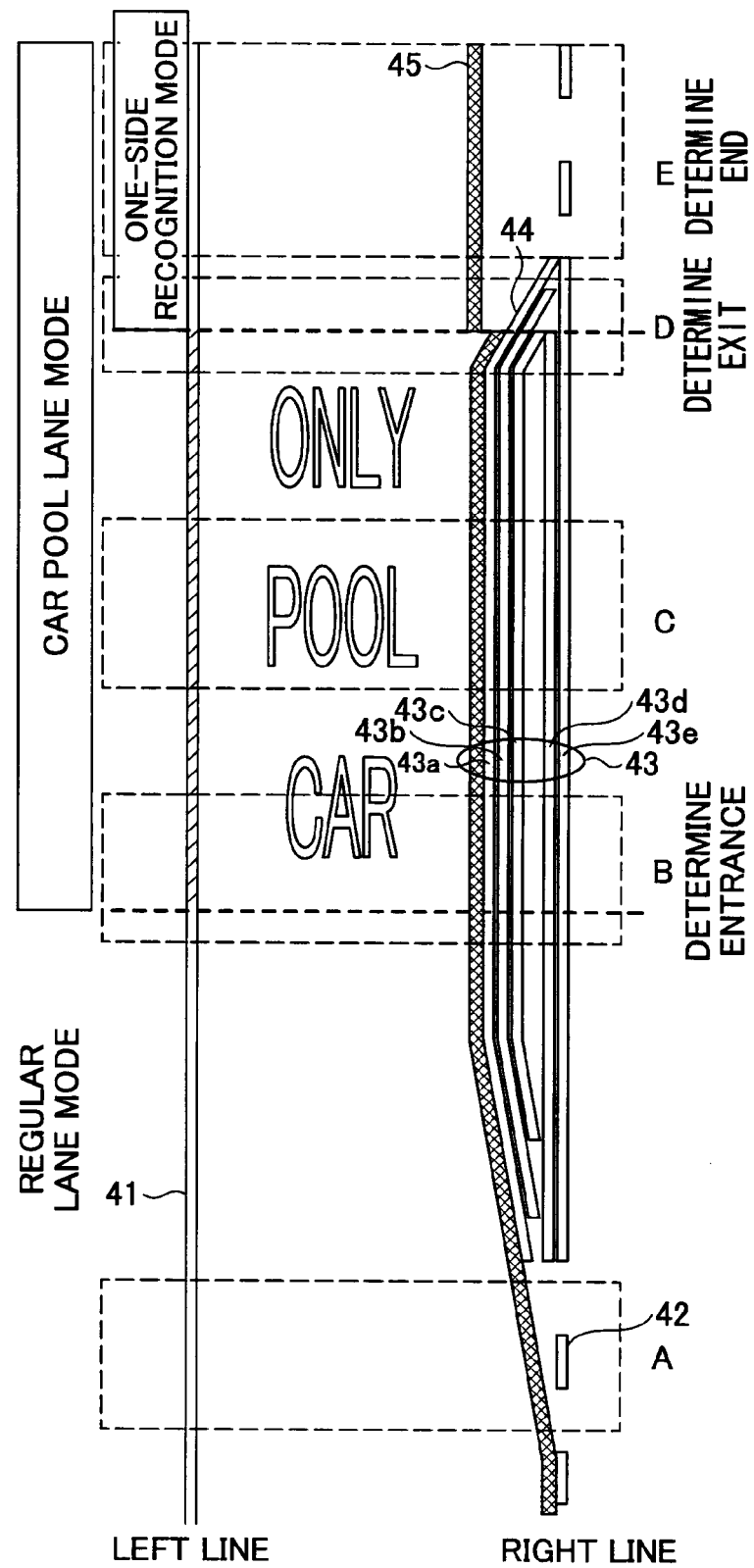
FIG. 6 is a schematic diagram for describing lane detection performed in a CPL by a lane detecting apparatus according to an embodiment of the present invention.

FIG. 6 is a schematic diagram showing a lane detecting operation performed in a CPL with the lane detecting apparatus 10 according to an embodiment of the present invention. In FIG. 6, like parts (components) are denoted by like reference numerals as of FIG. 1and are not further explained. Although the color of the left line is different in the CPL, the detected line is determined as the left line since the left line is a single line.

Meanwhile, as described below, the right line includes the actual lines and an imaginary line (illustrated in a net-like line in FIG. 6). Accordingly, the line 42 is determined as the right line in area A, the innermost line 43a is determined as the right line in areas B and C, and the innermost line 44 is determined as the right line in area D until the road curvature R of the line 44 surpasses a predetermined threshold. After the road curvature R of the line 44 surpasses the predetermined threshold in area D, the line 44 is ignored. Instead, an imaginary line 45, which is defined by the left line and the past (previous) line information, is determined as the right line. Therefore, even where the actual line on the right side is bent at the exit part of the CPL, the imaginary line 45 is recognized as a straight line.

Hence, with the lane detecting apparatus 10 according to the above-described embodiment of the present invention, the bent part at the exit part of the CPL can be appropriately determined. Thereby, a vehicle can be prevented from causing yaw movement towards the right side during LKA control.

With the lane detecting apparatus according to an embodiment of the present invention, a car pool lane can be accurately detected according to the difference between the numbers of candidate lines on the left side and right side of the vehicle.

Further, the present invention is not limited to these embodiments, but variations and modifications may be made without departing from the scope of the present invention.

The present application is based on Japanese Priority Application No. 2006-307936 filed on Nov. 14, 2006, with the Japanese Patent Office, the entire contents of which are hereby incorporated by reference.

What is claimed is:

1. A lane detecting apparatus mounted on a vehicle, the lane detecting apparatus comprising:
   a camera for obtaining an image of a lane marking drawn on a road;
   a candidate line selecting part for selecting one or more candidate lines having edge information no less than an edge threshold from the image obtained by the camera; and
   a car pool lane determining part for determining whether the difference in the number of the candidate lines between the left side of the vehicle and the right side of the vehicle is no less than a predetermined value;
   wherein when the difference is no less than the predetermined value, the lane detecting apparatus transfers to a car pool lane detection mode in which the candidate line selecting part detects the one or more candidate lines in accordance with a threshold that is less than the edge threshold.

2. The lane detecting apparatus as claimed in claim 1, further comprising:
   a line information calculating part for calculating a road curvature of the lane markings based on the one or more candidate lines;
   wherein the car pool lane determining part determines whether the road curvature of the one or more candidate lines on the right side of the vehicle is no less than a predetermined road curvature during the car pool lane detection mode;
   wherein when the road curvature of the one or more candidate lines on the right side of the vehicle is no less than the predetermined road curvature, the lane detecting apparatus transfers to a one-side recognition mode in which the line information calculating part calculates the road curvature of the lane markings based on the candidate line on the left side of the vehicle.

3. The lane detecting apparatus as claimed in claim 1, wherein the car pool lane determining part determines whether the difference in the number of candidate lines between the left side of the vehicle and the right side of the vehicle continues to be less than the predetermined value for more than a predetermined period during the car pool lane mode, wherein when the difference continues to be less than the predetermined value for more than the predetermined period, the lane detecting apparatus transfers to a regular lane mode in which the candidate line selecting part selects the one or more candidate lines based on the edge threshold.

* * * * *